United States Patent [19]

Sable et al.

[11] Patent Number: 4,917,795
[45] Date of Patent: Apr. 17, 1990

[54] AUTOMATIC VALVE ASSEMBLY

[75] Inventors: Chester A. Sable, Rancho California; Lawrence V. Maldarelli, Tustin; Henry Church, Whittier, all of Calif.

[73] Assignee: Anthony Industries, Inc., City of Commerce, Calif.

[21] Appl. No.: 195,603

[22] Filed: May 18, 1988

Related U.S. Application Data

[63] Continuation-in-part of Ser. No. 919,890, Oct. 15, 1986, Pat. No. 4,778,595.

[51] Int. Cl.⁴ ............................................. B01D 23/20
[52] U.S. Cl. .................................... 210/120; 210/123; 210/169; 137/614.2; 137/614.21; 137/202
[58] Field of Search ............... 210/169, 117, 119, 104, 210/120, 123, 128, 429, 430, 436, 245; 137/202, 587, 522, 614.21, 614.2; 251/332, 333

[56] References Cited

U.S. PATENT DOCUMENTS

| 511,995 | 1/1894 | Buckley | 210/120 |
|---|---|---|---|
| 540,760 | 6/1895 | Sawyer | 137/198 |
| 757,873 | 4/1904 | Allen | 137/198 |
| 924,641 | 6/1909 | Crispin | 137/202 |
| 1,073,354 | 9/1913 | Lauterbach | 137/198 |
| 1,294,002 | 2/1919 | Weatherhead | 137/202 |
| 1,698,990 | 1/1929 | Derryberry | 137/202 |
| 2,111,473 | 3/1938 | Hudson | 137/202 |
| 2,347,092 | 4/1944 | Evans | 210/169 |
| 2,752,941 | 7/1956 | Mitchell | 251/333 |
| 2,764,172 | 9/1956 | Strayer | 137/202 |
| 2,768,704 | 10/1956 | Cronkhite | 137/202 |
| 2,909,186 | 10/1959 | Larsen | 137/202 |
| 2,935,990 | 5/1960 | Biddle | 137/202 |
| 3,152,604 | 10/1964 | Frye et al. | 137/202 |
| 3,216,451 | 11/1965 | Smallpiece | 137/861 |
| 3,396,974 | 8/1968 | Nord | 227/9 |
| 3,401,751 | 9/1968 | Loftin et al. | 137/202 |
| 3,586,032 | 6/1971 | Weinstein | 137/202 |
| 3,736,950 | 6/1973 | Smallwood | 137/202 |
| 3,786,829 | 1/1974 | Nardo et al. | 137/202 |
| 3,957,640 | 5/1976 | Stack | 210/117 |
| 4,094,346 | 6/1978 | Milo | 137/202 |
| 4,230,142 | 10/1980 | Saarem et al. | 137/202 |
| 4,457,325 | 7/1984 | Green | 137/202 |
| 4,562,852 | 1/1986 | Britt | 137/614.2 |
| 4,574,048 | 3/1986 | vn den Broek | 210/169 |
| 4,640,304 | 2/1987 | Looney | 137/202 |

FOREIGN PATENT DOCUMENTS

| 2348209 | 4/1974 | Fed. Rep. of Germany | 137/202 |
|---|---|---|---|
| 2800556 | 7/1979 | Fed. Rep. of Germany | 137/202 |
| 1479517 | 3/1967 | France . | |
| 53836 | 11/1910 | Switzerland . | |
| 3875 | of 1896 | United Kingdom . | |
| 966203 | 8/1964 | United Kingdom . | |

OTHER PUBLICATIONS

The Johnson Corporation, Bulletin VB-1001, "Vacuum Breakers", 6/12/84.
The Johnson Corporation, private communication including letter dated 1/3/85 and drawing dated 6/23/82.
pp. 6-25 and 6-26 of Parker Handbook.

Primary Examiner—W. Gary Jones
Assistant Examiner—Coreen Y. Lee
Attorney, Agent, or Firm—David Weiss

[57] ABSTRACT

An improved automatic air pressure relief and check valve assembly which may be used in combination with a swimming pool filter tank or a swimming pool separation tank. The valve assembly includes a normally open lower valve which communicates with the inside of the tank and is responsive to the tank's being full of pressurized water for closing the lower valve. The valve assembly further includes a normally closed upper valve communicating with the lower valve and the outside of the tank, the upper valve being responsive to air being expelled from the tank through the open lower valve, when water is filling the tank, for opening the upper valve to permit the air being expelled to exit through the upper valve. Cooperating with the upper and lower valve of the improved valve assembly is means for precluding both the upper and the lower valves from being simultaneously maintained in their closed conditions. Associated with the normally closed upper valve is selectively actuable means responsive to an externally applied force for opening and maintaining open the upper valve while the force is applied during selected times when water is not entering the tank, for permitting air to enter the tank so that water may be drained from the tank when desired.

32 Claims, 7 Drawing Sheets

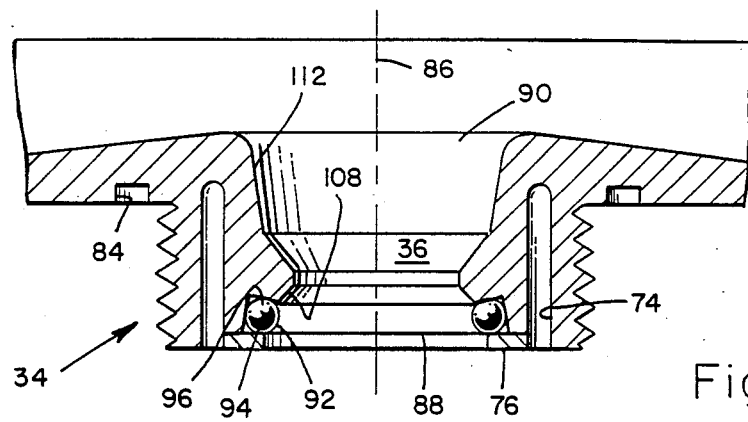
Fig. 3.
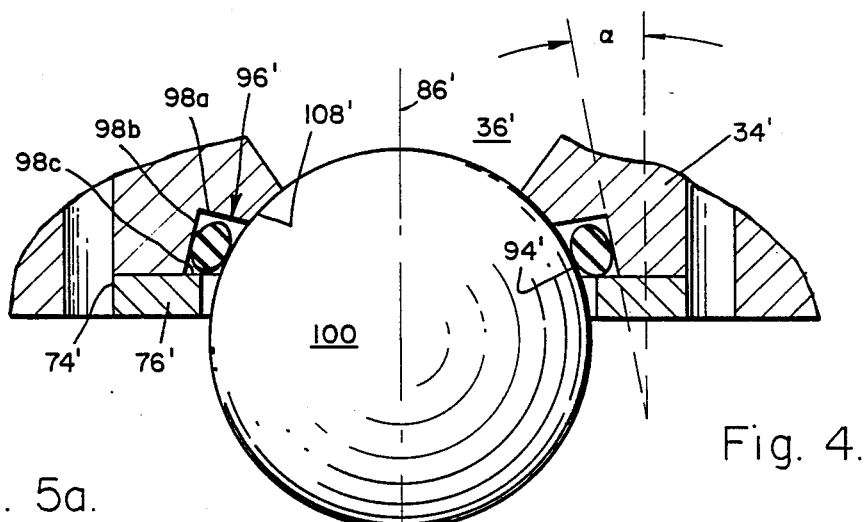
Fig. 4.
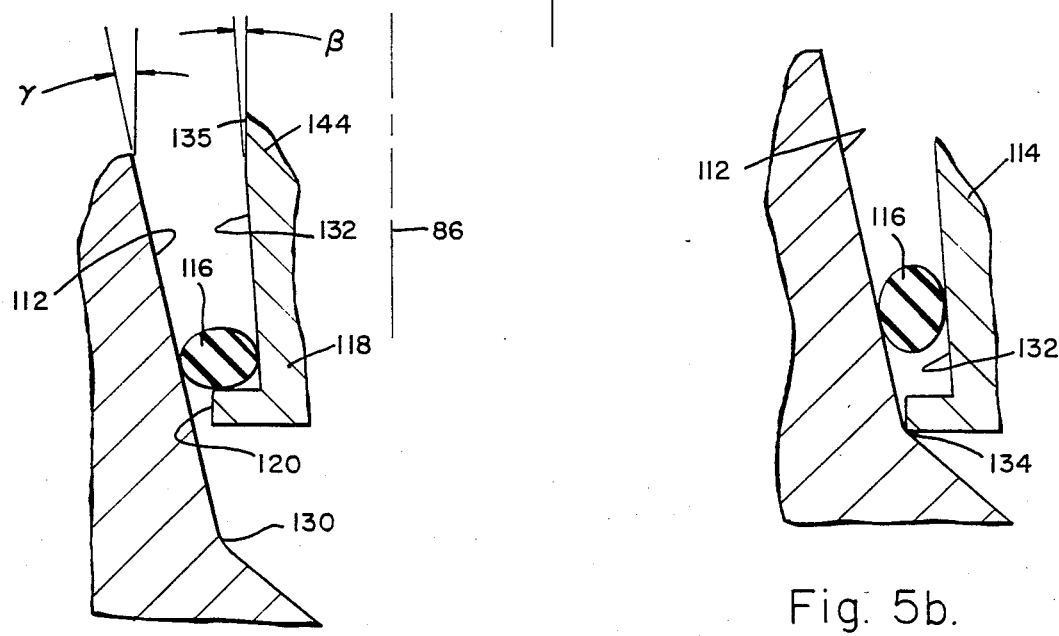
Fig. 5a.
Fig. 5b.

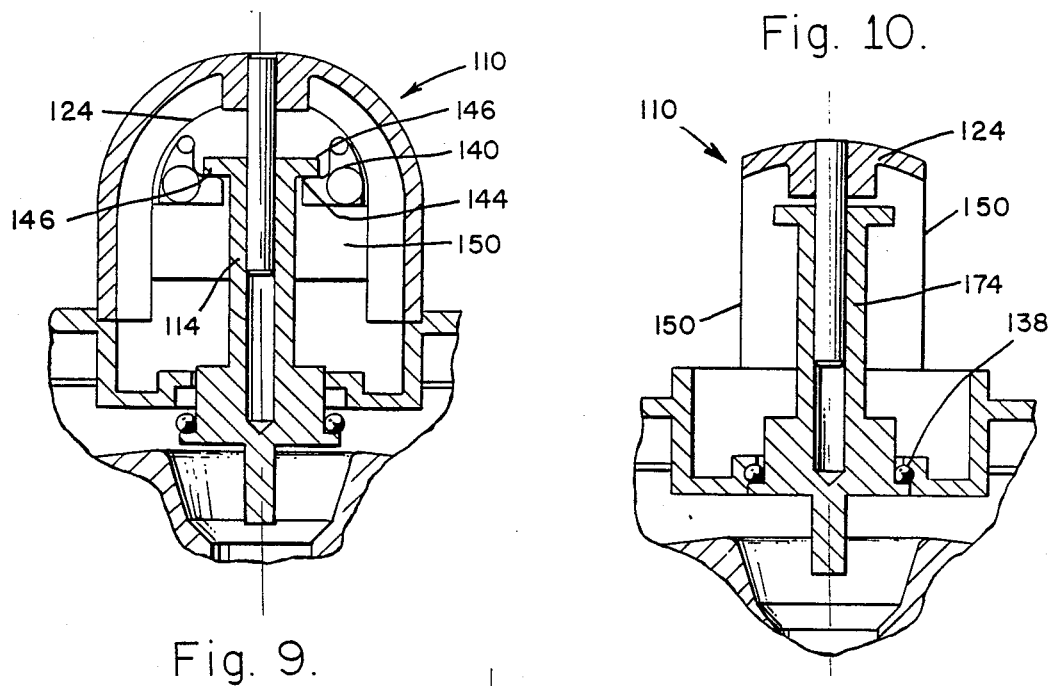
Fig. 10.
Fig. 9.
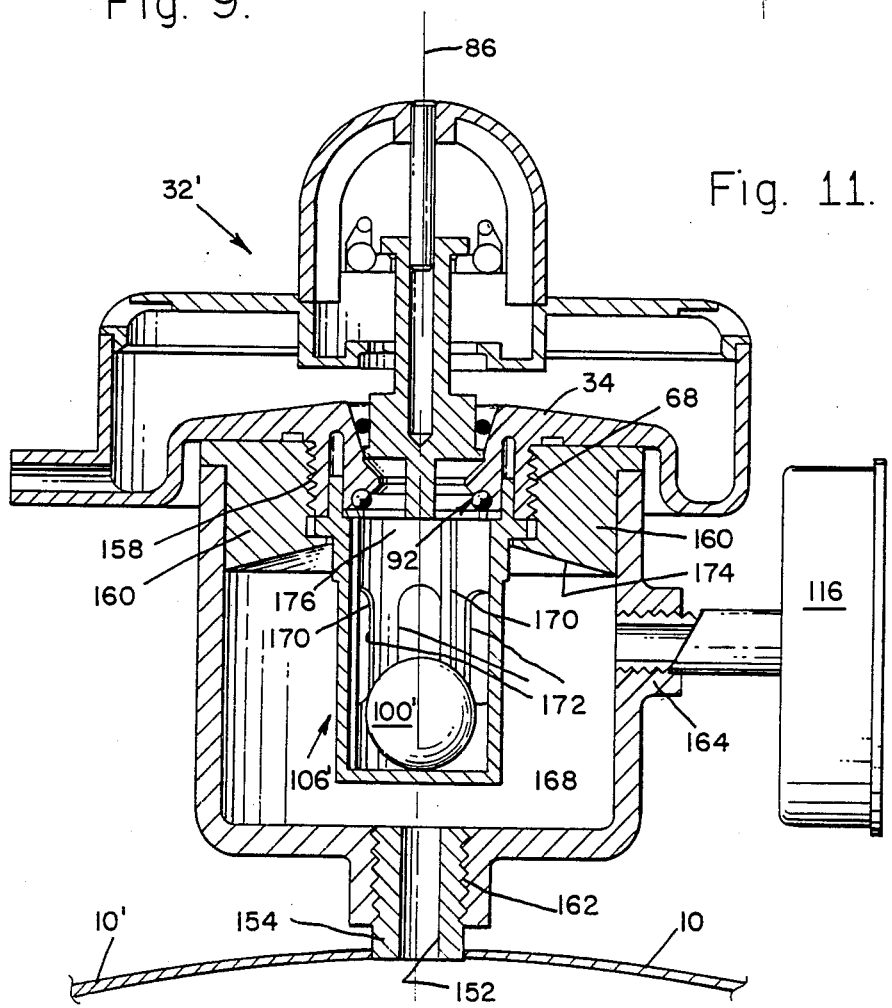
Fig. 11.

AUTOMATIC VALVE ASSEMBLY

CROSS-REFERENCE TO RELATED APPLICATION

This application is a continuation-in-part of co-pending U.S. patent application Ser. No. 06/919,890, filed Oct. 15, 1986, now U.S. Pat. No. 4,778,595, assigned to and owned by the assignee and owner of the present application.

BACKGROUND OF THE INVENTION

This invention relates to valve assemblies, and more particularly to an improved automatic air pressure relief and check valve assembly which, when used in combination with a swimming pool filter tank, automatically opens for permitting air to be evacuated from the tank while the the tank is being filled with water; automatically closes when the tank is full of water for permitting filtration of the pressurized water; and remains closed for preventing air from entering the tank when the water is not pressurized, to prevent the water in the tank from draining until such time when draining is desired.

Most swimming pools include a water recirculation system where water from the pool is circulated through a filter and then returned to the pool. The filter generally comprises a water tank which contains a bed of granular filter material such as sand, or filter elements coated with diatomaceous earth, through which the pool water is forced for removing solid particles from the water. The filtered water is then returned to the swimming pool. Water circulation is conventionally accomplished by means of an electrically driven water pump situated in the water line between the pool and the inlet side of the filter tank, although in some filter systems the pump is situated between the pool and the outlet side of the tank.

Proper maintenance of such filters requires that the tank be disassembled from time to time, for permitting maintenance of the sand bed and cleaning of the diatomaceous earth filter elements. Prior to tank disassembly, of course, the tank must be drained of water.

In swimming pool filter systems of the prior art, a manual air relief valve is conventionally attached to the upper portion of the filter tank. The air relief valve is manually opened to permit air to enter the tank so that the tank may be drained prior to tank disassembly. After the filter has been maintained and the tank reassembled, the maintenance person must assure that the relief valve is open so that air will be permitted to escape from the tank while the tank is being filled with water. When the tank becomes full, the maintenance person must manually close the valve to prevent water from escaping therethrough and to permit recirculating water pressure to be established, as well as for precluding re-entry of air into the tank when the pump is periodically shut down.

SUMMARY OF THE INVENTION

The valve assembly of the present invention, which automates critical valve functions when used in combination with a swimming pool filter tank, is an improvement of the valve assembly disclosed in related U.S. patent application Ser. No. 06/919,890 to which reference is made above.

The present valve assembly includes a normally open lower valve which, when the valve assembly is attached to the upper portion of the tank, communicates with the inside of the tank and is responsive to the tank's being full of water, entering through the tank's water inlet, for closing the lower valve. The valve assembly further includes a normally closed upper valve communicating with the lower valve and the outside of the tank, the upper valve being responsive to air being expelled from the tank through the open lower valve, when water is filling the tank through the tank's water inlet, for opening the upper valve to permit the air being expelled to exit through the upper valve. Cooperating with the upper and lower valves of the improved valve assembly is means for precluding both upper and lower valves from being simultaneously maintained in their closed conditions. Associated with the normally closed upper valve is selectively actuable means responsive to an externally applied force for opening and maintaining open the upper valve when the force is applied during selected times when water is not entering the tank, permitting air to enter the tank so that water may be drained from the tank.

The dual valve assembly of the present invention includes a valve body having a passageway communicating with the inside of the tank through a lower port, and communicating with the outside of the tank through an upper port. The lower valve includes a buoyant valve member, a valve seat about the lower port and adapted for seating engagement with the valve member to close the lower port, and means normally supporting the valve member and for guiding the valve member to float upwardly for engaging the valve seat when the tank becomes full of water.

The upper valve includes a valve member, and a valve seat about the upper port adapted for seating engagement by the upper valve member for closing the upper port. The upper valve member is normally in seating engagement with the valve seat and is unseated therefrom when air is forced from the tank through the passageway while water is filling the tank, and the upper valve member is not permitted to seat when the lower valve is closed while the tank is full of pressurized water. The upper valve member seats when the water in the tank becomes unpressurized (i.e., the water pressure falls to atmospheric when water recirculation ceases), and the lower valve member is prevented from remaining closed under these conditions.

The selectively actuable means associated with the upper valve permits the upper valve member to be unseated from the valve seat for admitting air into the tank when the water in the tank is unpressurized, permitting water to drain from the tank through an opening in the lower portion of the tank.

The improved valve assembly of the present invention is adapted for being coupled to the upper portion of a swimming pool filter tank having a water inlet and a water outlet communicating with a swimming pool, and including a pump for circulating water from the pool through the inlet into the tank and from the tank through the outlet into the pool when the pump is operating. The valve assembly is attached to the top of the filter tank with the normally open lower valve communicating with the inside of the tank. The lower valve is responsive to the tank's being full of water, while the pump is operating, for closing the lower valve. The normally closed upper valve, communicating between the lower valve and the outside of the tank, is responsive to air being expelled from the tank through the lower valve when water is filling the tank while the pump is operating, for opening the upper valve to permit the air being expelled to exit through the upper valve. The improved valve assembly includes means cooperating with the lower and upper valves for preventing both valves from being simultaneously maintained in their closed conditions. In its preferred embodiment, such means cooperating includes means coupled to the upper valve for precluding the upper valve from closing when the lower valve is in its closed condition in response to the tank's being full of water while the pump is operating, and for precluding the lower valve from remaining closed when the upper valve is in its closed condition when the tank is full of water while the pump is not operating. The valve assembly further includes selectively actuable means associated with the upper valve and responsive to an externally applied force for opening and maintaining open the upper valve while the force is applied during selected times while the pump is not operating, to permit water to drain from the tank.

In the preferred embodiment of the valve assembly according to the present invention, the buoyant valve member of the lower valve has a spherical surface and is preferably a sphere, although a cylindrical member having at least one hemispherical end may alternatively be employed. The valve seat of the lower valve includes an annular channel in the valve body about the lower port, with an O-ring situated in the channel and having an inside diameter smaller than the diameter of the spherical valve member. The lower port is sealed when the buoyant spherical valve member is forced against the O-ring when the tank becomes full of water under pressure and remains sealed while water pressure is maintained.

The preferred embodiment of the upper valve includes a novel plunger-type valve member having a lower portion for being received by the passageway to close the upper port. The passageway of the valve body has an interior upwardly and outwardly extending conical surface about the passageway vertical axis, and the lower portion of the plunger has an exterior upwardly and outwardly extending conical surface about the same axis, the angle of inclination (from the vertical axis) of the plunger being equal to or less than the angle of inclination of the valve body conical surface. An O-ring is carried by the plunger lower portion with its inner circumference in contact with the plunger conical surface, the outer circumference of the O-ring being in contact with the passageway conical surface when the plunger lower portion is received by the passageway such that the O-ring is disposed within an annular space between the conical surfaces. When the plunger is coerced downwardly, as in response to a vacuum within the tank, the downwardly decreasing annular space between the conical surfaces cause the O-ring to be squeezed within the space and to roll upon itself, resulting in a tight seal. A tang projects downwardly from the bottom surface of the plunger, the tang having a length which is longer than the distance between the plunger's bottom surface when the plunger is sealing the upper port and the uppermost surface of the buoyant spherical member when the spherical member is sealing the lower port, precluding both the upper and lower valve members from being in simultaneous seating engagement with their respective valve seats. The upper portion of the upper valve member is accessible for manually applying an upward force to the plunger when the pump is not operating, for coercing the plunger from its seated condition, for opening the upper valve to relieve the vacuum in the tank when it is desired to permit the water to drain from the tank. The upper valve remains open while the upward force continues to be applied, and closes when the application of the upward force is discontinued.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example, and wherein like reference numerals are utilized to indicate like components. It is to be expressly understood, however, that the drawings are for the purpose of illustration and description only, and are not intended as a definition of the limits of the invention.

FIG. 3 is a front elevation cross-sectional view of a fragment of the body portion of the valve assembly of FIG. 2 enlarged for clarity;

FIG. 4 is an elevation cross-sectional view of a fragment of an alternative configuration of the lower valve in enlarged detail;

FIG. 5a is an elevation cross-sectional view of a fragment of the upper valve showing the upper valve seating mechanism in enlarged detail;

FIG. 5b is an elevation cross-sectional view of the fragment of FIG. 5a, showing operation of the upper valve seating mechanism in enlarged detail;

FIG. 9 is a fragmentary side elevation cross-sectional view of the upper valve similar to that shown in FIG. 8;

FIG. 10 is a fragmentary side elevation cross-sectional view of the upper valve, indicating an alternative configuration of the feature permitting air to enter the tank when actuated;

FIG. 11 is a front elevation cross-sectional view of a variation of the preferred embodiment of the valve assembly according to the present invention.

DESCRIPTION OF THE PREFERRED EMBODIMENT

Figure 1:
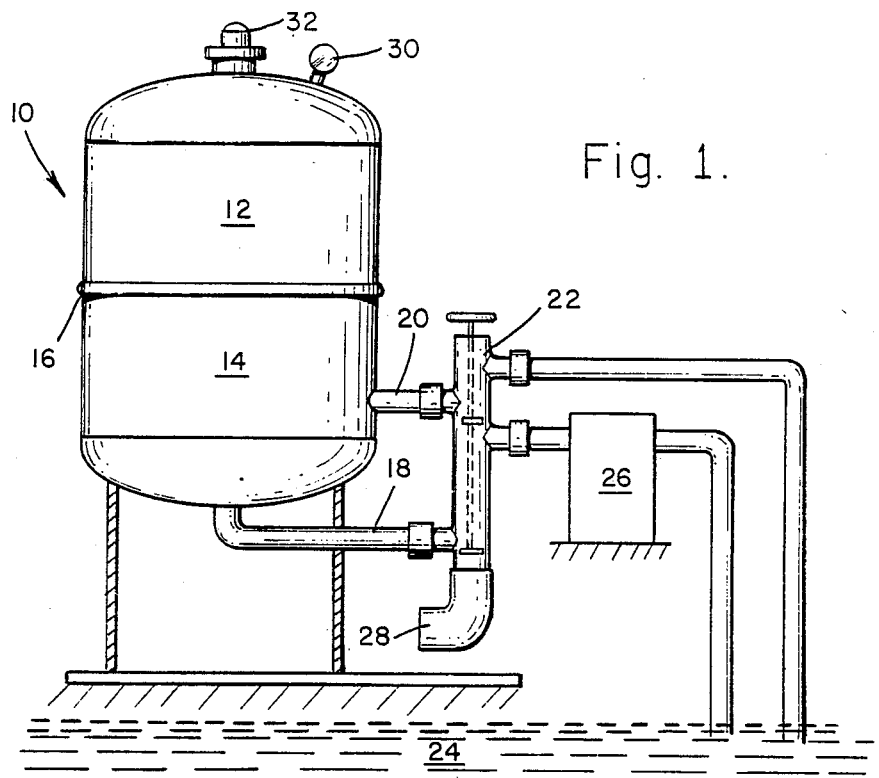
FIG. 1 is an elevation view of a filter tank in a swimming pool environment, the tank being shown with the valve assembly of the present invention in place.

Turning to FIG. 1, a conventional swimming pool filter tank 10 is situated above water level of a swimming pool 24, and may include an upper section or cover 12 and a lower section 14, held together in sealing engagement at their respective flanges 16. A swimming pool filter tank of this type is described in U.S. Pat. No. 3,653,513, and includes a bottom pipe connection 18 and a side pipe connection 20 which are connected to a three-way valve 22. In the filter setting of the valve 22, (diagramatically indicated in FIG. 1), water from the pool 24 is pumped by a pump 26 through the bottom pipe 18 which serves as a water inlet for filling the tank 10. The pressurized water within the tank 10 is then filtered by filter elements (not shown, but which may be of the type disclosed in U.S. Pat. No. 3,653,513) within the tank 10 and then returned to the pool through the side pipe 20 which serves as a water outlet. Setting of the three-way valve 22 to its backwash position causes water to be pumped from the pool 24 into the tank 10 through the side pipe 20 which thereupon serves as the water inlet, and to exit the tank 10 to waste 28 through the bottom pipe 18 which now serves as a water outlet. During filtering, pressure of the water in the tank 10 may be indicated by such means as a pressure gauge 30 communicating with the inside of the tank 10.

During an initial filling of the tank 10, which may occur after the filter material or elements have been installed within the tank 10 such as following cleaning, water entering the tank 10 through the bottom pipe 18 must fill the tank 10 to cover the filter elements and to assure that sufficient water pressure may be established for efficient filtration and proper water recirculation. Water filling the tank 10 displaces the air within the tank 10, and the displaced air exits the tank 10 through the valve assembly 32 of the present invention which is attached to the upper portion or top of the tank 10. When all of the air is evacuated and the tank 10 becomes full of water while the pump continues to operate, the valve assembly 32 automatically closes, preventing the water from leaving the tank 10 through the valve assembly 32 and permitting filtration and recirculation to occur. The valve assembly 32 then prevents the admission of ambient air into the tank 10 through the valve assembly 32, so that the pump's being turned off will not cause the water within the tank to drain into the pool 24 through, for example, the lower pipe 18 (which would then serve as an outlet), unless one desires draining to occur. In such latter event, the valve assembly 32 may be manually actuated to permit such draining, either into the pool 24 or to waste 28 according to appropriate setting of the three-way valve 22. The features of the valve assembly 32 which permit such operation are hereinafter described.

Figure 2:
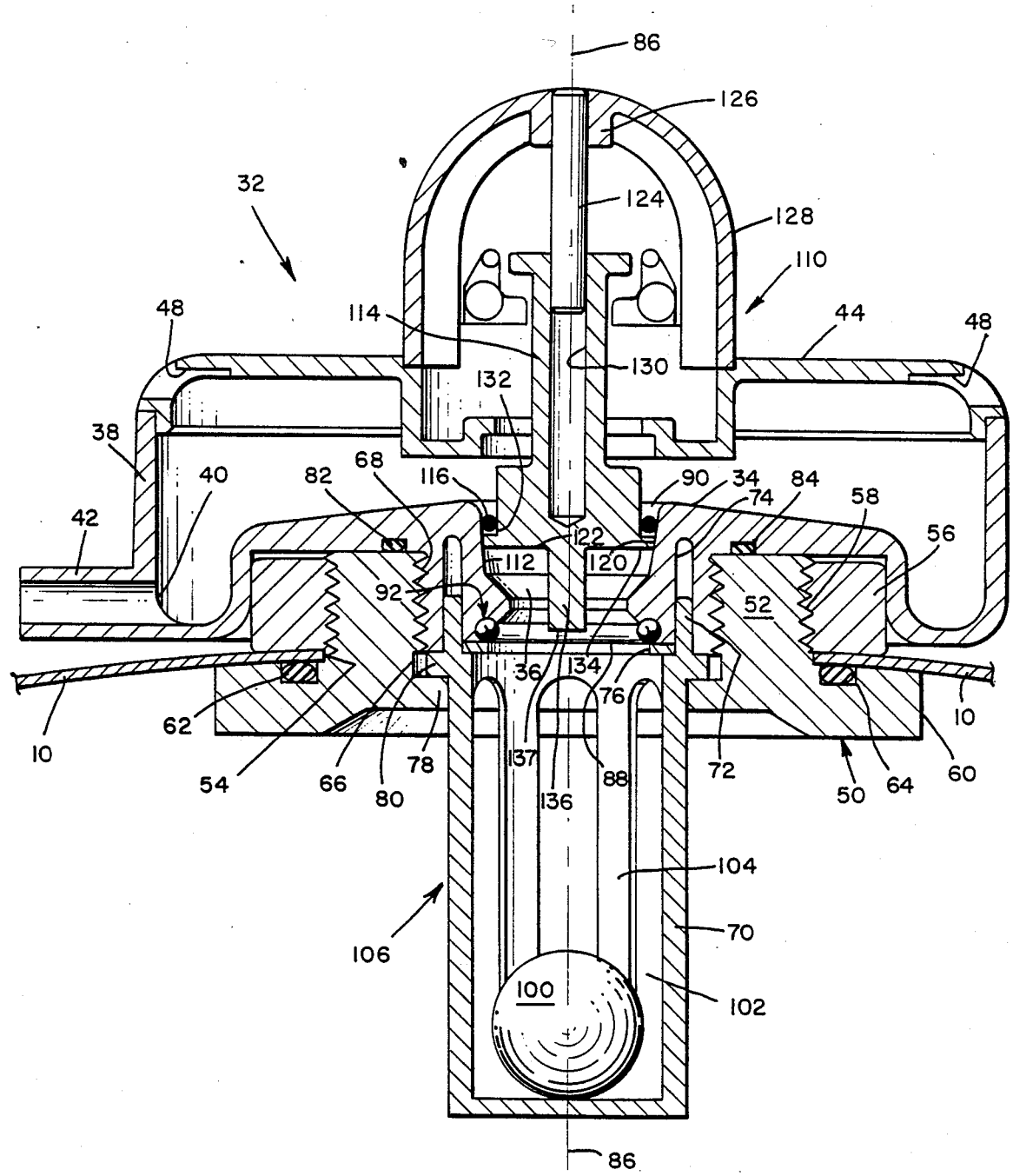
FIG. 2 is a front elevation cross-sectional view of a preferred embodiment of the valve assembly of the present invention, attached to the filter tank, indicating the normal configuration of the valve assembly.
Figure 6:
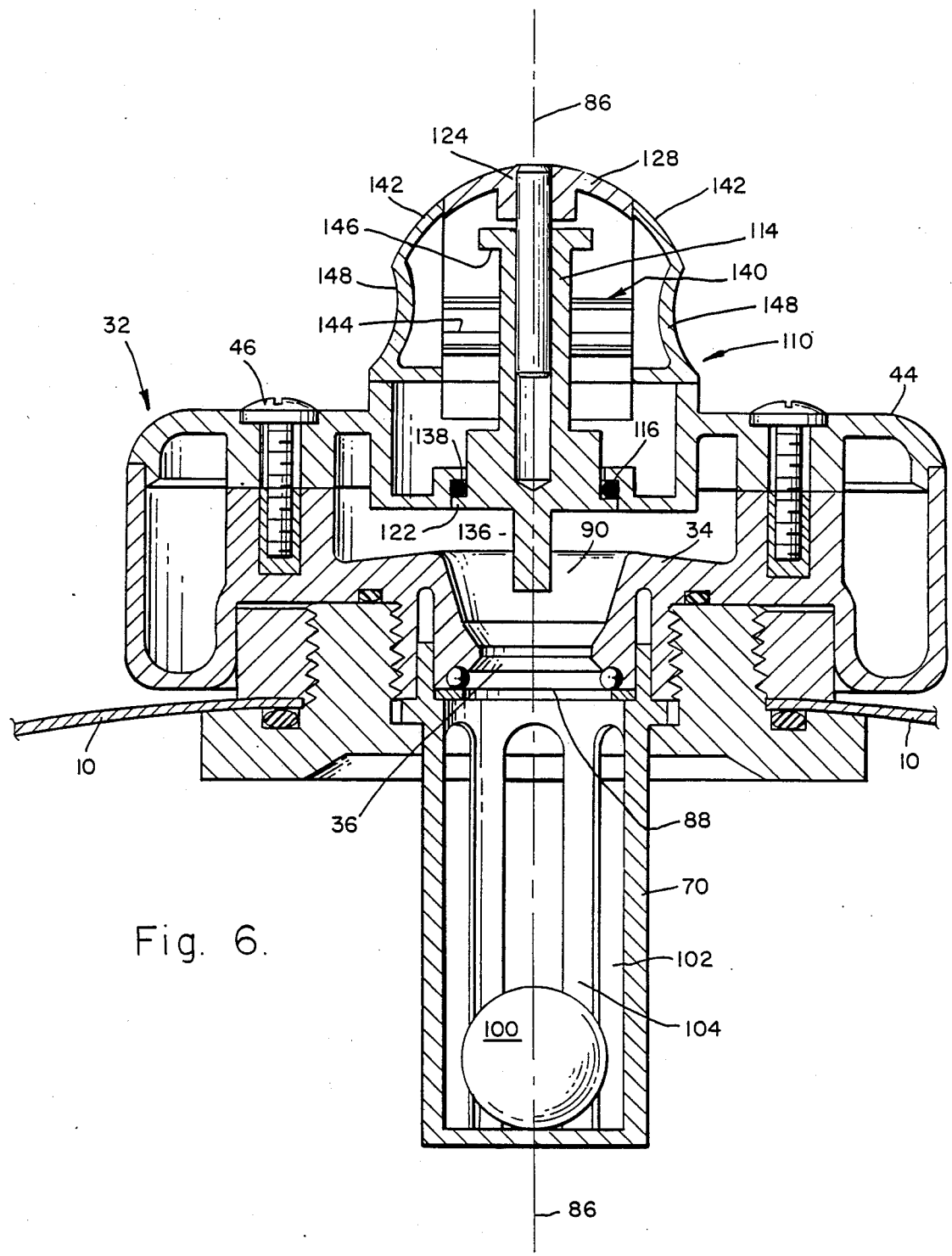
FIG. 6 is a side elevation cross-sectional view of the valve assembly of FIG. 2, indicating operation of the valve assembly when water is filling the tank.
Figure 8:
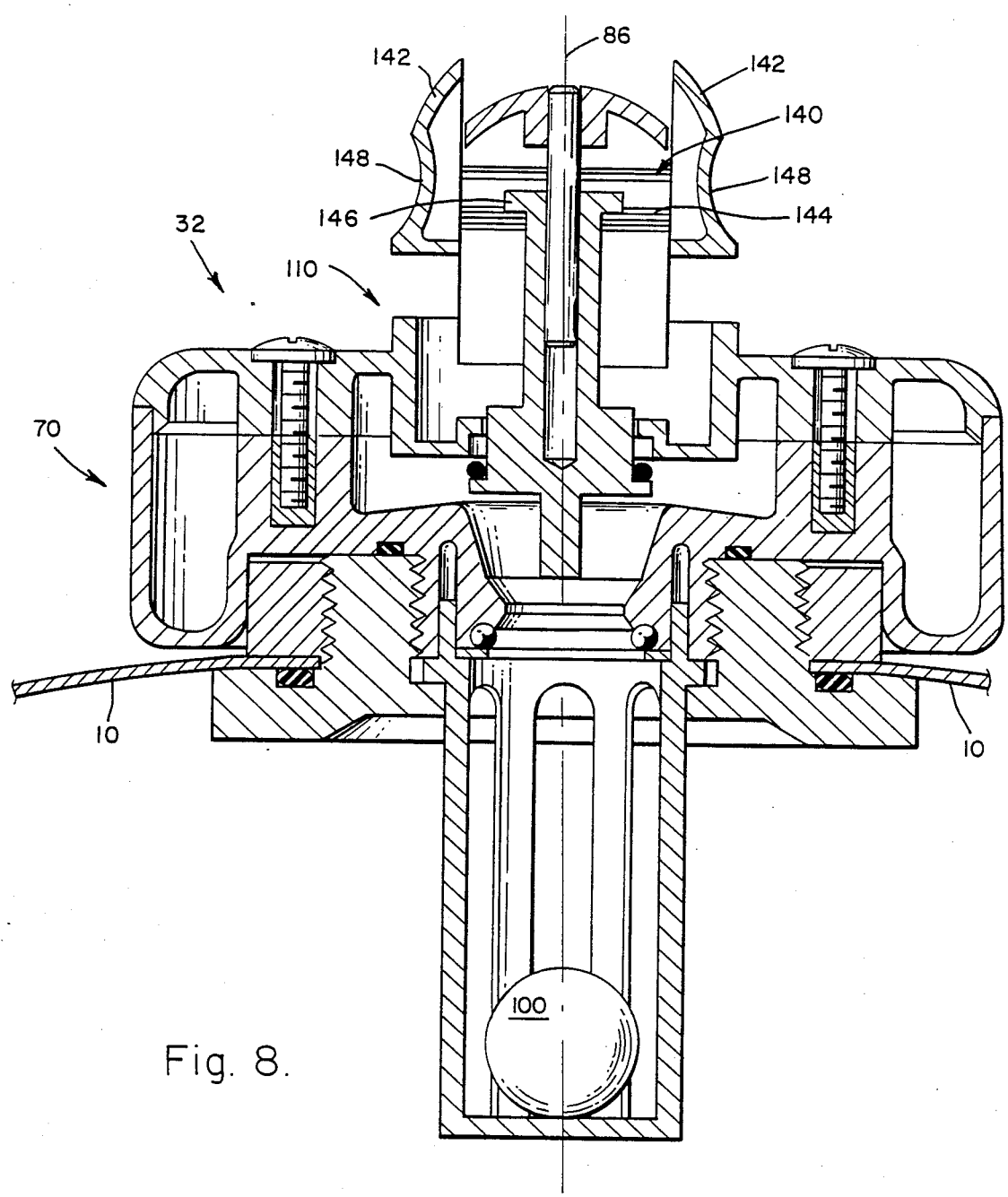
FIG. 8 is a side elevation cross-sectional view of the valve assembly of FIG. 2, indicating a feature of the valve assembly which permits air to enter the tank when actuated.

Turning next to FIG. 2, the preferred embodiment of the valve assembly 32 includes a circular valve body 34 (shown enlarged in FIG. 3) coupled to the tank 10 such that a passageway 36 through the valve body 34 communicates with the inside and the outside of the tank 10. The preferred valve body 34 is configured to include a water catch basin 38 with a drain hole 40 to which is attached a drain tube 42, the purpose of which will be explained later. A cover 44 is removably attached to the basin 38, for example by screw fastener means 46 shown in FIG. 6. The cover 44 includes apertures 48 for facilitating the exhaust or entry of air from or into the tank 10 during operation of the valve assembly 32 when the passageway 36 is open, as shown in FIGS. 6 or 8.

In the embodiment shown in FIG. 2, the valve assembly 32 is coupled to the top or upper portion of the tank 10 through the use of a mounting ring or adapter 50 having an annular shoulder 52 projecting through a circular aperture 54 at the top of the tank 10, and is retained by means of a nut 56 threadedly engaging external threads 58 of the adapter annular shoulder 52 and bearing against the top exterior wall surface of the tank 10 about the circular aperture 54. A lower portion 60 of the adapter 50 includes an annular groove 62 containing an O-ring 64 such that the upper surface of the lower adapter portion 60 is secured against the interior wall surface of the tank 10 with the O-ring 64 forming a seal about the circular aperture 54 when the retaining ring or nut is tightened against the exterior surface of the tank 10. The valve body 34 is secured within a central aperture 66 of the adapter 50, by means of valve body circumferencial threads 68 engaging corresponding internal threads of the shoulder 52.

A support basket 70 is appended to the valve body 34 beneath the passageway 36, by such means as a ring 72 upwardly projecting from the basket 70 and including a plurality of ribs on its inner surface for being retained by an annular groove 74 in the valve body 34, also retaining a washer or sealing ring 76 between the bottom of the valve body 36 and the top of the basket 70 and circumferentially inwardly extending. Further, the lower portion of the adapter 50 is configured about its central aperture 66 to include an annular shelf 78 for supporting an annular external lip 80 of the basket 70, the top surface of which engages a mating lower surface of the valve body 34.

A water tight seal between the valve body 34 and the adapter 50 is provided by an O-ring 82 situated within a downwardly facing annular channel 84 of the valve body 34 in contact with the upwardly facing surface of the adapter annular shoulder 52.

The passageway 36 of the valve assembly 34 is oriented about a vertical axis 86 with the passageway's lower circular opening or port 88 (see also FIG. 3) communicating with the inside of the tank 10 and the passageway's upper opening or port 90 communicating with the outside of the tank 10 through the cover apertures 48. As best shown in FIG. 3, a lower valve seat 92 is formed about the lower port 88 of the passageway 36, by means of a lower valve O-ring 94 retained by a lower valve seat annular channel 96 and the sealing ring 76 which in turn is retained between the valve body 36 and the basket 70 as previously described.

The lower valve seat channel 96 may be of conventional design as shown in FIG. 3, or alternatively the lower valve seat channel 96' shown in FIG. 4 may be utilized. In this alternative configuration, the channel 96' is inclined upwardly and inwardly toward the vertical axis 86', the purpose of which will be explained later. The channel 96' is defined by two components, i.e., a first component describing two adjacent walls 98a, 98b within the valve body 34' and a second component describing a third wall 98c formed by the sealing ring 76' which either may be permanently affixed to the lower end of the valve body 34' or may be retained as previously described with respect to the analogous sealing ring 76 of FIG. 2.

Returning to FIG. 2, situated below the lower valve seat 92 is a lower spherical valve member or ball 100 normally supported within the basket 70. The spherical valve member 100 is buoyant, having a specific gravity less than that of water, and may be made of such material as polypropylene. The basket support 70 includes a plurality of slots 102 for permitting water to be admitted into the basket 70 when the tank 10 becomes full with water while preventing admission to the valve assembly 32 of solid matter of substantial size which may be carried by the water. In the embodiment shown in FIG. 2, the vertical wall material between the slots 102 provide guide surfaces 104 for vertically guiding the ball 100 when it is lifted from its normal position at the bottom of the basket 70.

Figure 7:
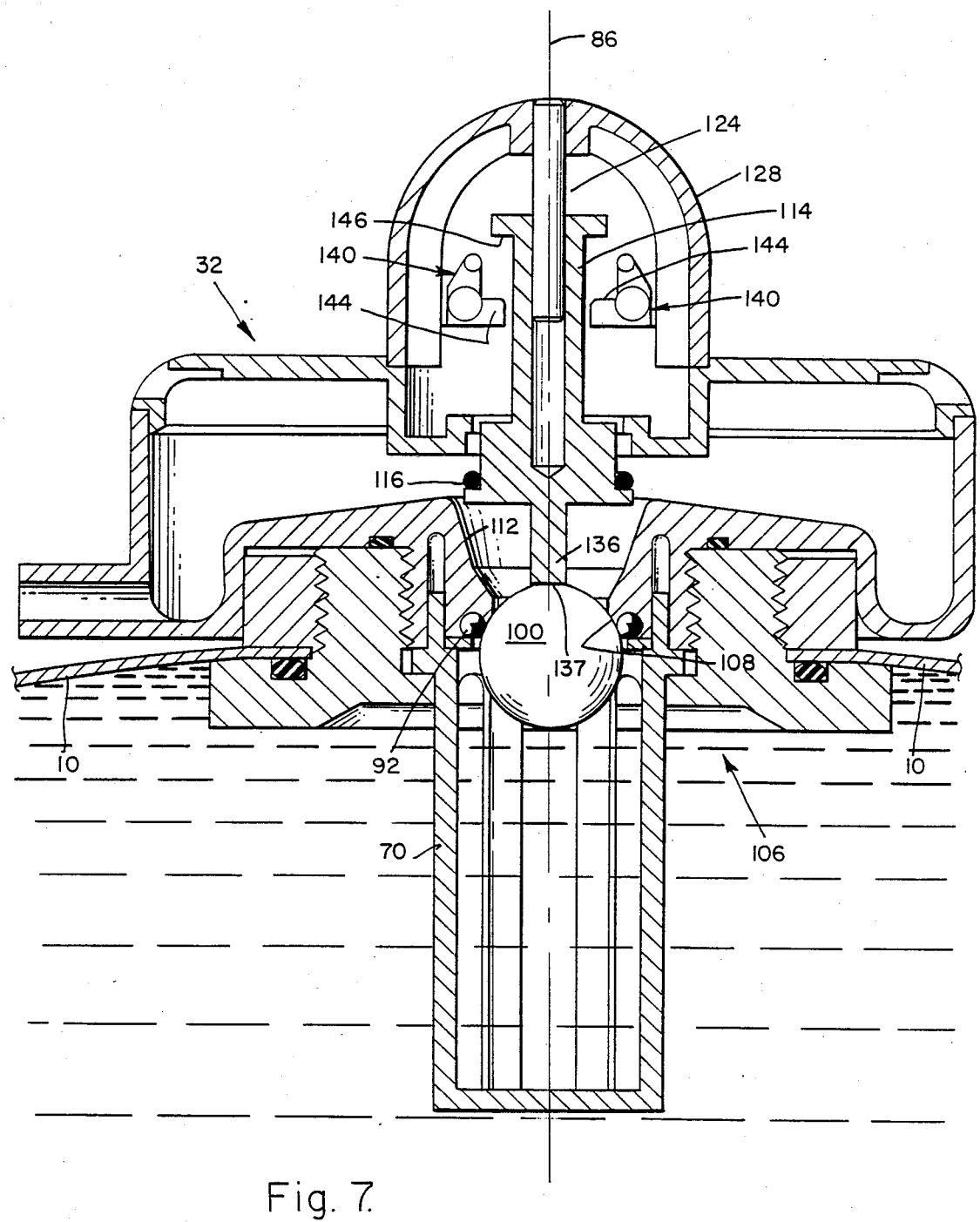
FIG. 7 is a front elevation cross-sectional view of the valve assembly of FIG. 2 indicating operation of the valve assembly after water has filled the tank.

The combination of the buoyant ball 100, the lower valve seat 92 and the basket support 70 comprises a first or lower valve 106 which is normally in an open condition as shown in FIG. 2. When the water has filled the tank 10, as shown in FIG. 7, the water entering the basket 70 causes the buoyant ball 100 to float within the basket 70 and to be carried by the water into engagement with the lower valve O-ring 94. Since the inside diameter of the O-ring 94 is smaller than the diameter of the ball 100, the seating of the ball 100 in the O-ring seat 92 closes the lower valve 106 against water escaping from the tank 10 through the passageway 36. In order to assure proper sealing of the O-ring seat 92, as well as to assure that the ball 100 does not overly compress the O-ring 94, a stop 108 having a spherical surface conforming to the ball 100 is provided immediately above the seat channel 96. When subjected to forces of sufficiently great magnitude, the ball 100 is in contact with the stop 108 which further acts as a spherical seat which may provide additional sealing, particularly if the valve body 34 is made of a plastic material. In an example of a lower valve 106, a valve ball 100 having a 0.625 inch diameter was successfully used with a Parker No. 2-113 O-ring 94.

Referring to the alternative lower valve seat configuration shown in FIG. 4, seating and unseating of the ball 100 in the O-ring seat are enhanced by the inclination of the second wall 98b of the O-ring seat channel 96' and the freedom of movement of the O-ring 94' within the channel 96'. The second channel wall 98b is inclined at an angle $\alpha$ from vertical, upwardly and inwardly toward the vertical axis 86' of the passageway 36', so that the second wall 98b is a portion of a conical surface having a diameter decreasing toward the passageway 36'. The angle $\alpha$ is sufficiently small to permit rolling of the O-ring 94' about itself when the buoyant ball 100 is pressed against the O-ring 94' by a force derived from the pressure of the water within the tank 10, but should not be so great as to preclude the O-ring 94' from creating an effective seal. One example of a suitable angle $\alpha$ is 15°, although other values of the angle $\alpha$ meeting the above qualifications would also be suitable.

When in an unstressed condition, the O-ring 94' is situated in contact with the conical channel wall 98b and the lower or third channel wall 98c which may but need not be perpendicular to the second wall 98b; the purpose of the third channel wall 98c is to retain the O-ring 94' in the channel 96' when the O-ring 94' is in its relaxed state. As the ball 100 begins to press against the O-ring 94' from the force derived from the pressure of the water within the tank 10, the ball 100 begins to squeeze the O-ring 94' and at the same time causes the O-ring 94' to roll along the conical surface 98b. The position of the first surface 98a is preferably sufficiently distant from the third surface 98c such that the O-ring 94' will not roll into the first surface 98a; i.e., the channel 96' is sufficiently wide along its conical wall 98b so that the O-ring 94' stops rolling before the wall 98a is contacted. The nominal diameter of the channel 96', the angle $\alpha$ and the characteristics of the O-ring 94' are preferably selected such that the expected force exerted by the ball 100 causes the O-ring 94' to rotate approximately one-eighth turn.

The rolling and wedging action of the O-ring 94' produces a sealing force greater than the force applied by the ball 100 derived from the water pressure from within the tank 10. The rolling action also causes the O-ring 94' to act like an elastomeric spring which, as it unwinds (when the pump is shut off) decreases a tendency for the ball 100 to be retained by the seat 96' by tending to coerce the ball 100 from the seat 96'. If the O-ring 94' has not been forced to rotate more than 180°, the nearest stable position when it unwinds will be its starting position, i.e. the O-ring 94' will be in contact with the second and third walls 98b, 98c.

In an example of a lower valve seat 96' with an inclination angle $\alpha$ of approximately 15°, a valve ball 100 having a 0.625 inch diameter was successfully used with a Parker No. 2-015 O-ring 94'.

Returning again to FIG. 2, the valve assembly 32 includes a second or upper valve 110 which, in its preferred embodiment, includes a conical valve seat 112 within the passageway 36 and about the upper port 90, and a plunger-type valve member 114. The plunger 114 is adapted for travel along the valve vertical axis 86 and carries an O-ring 116 about its lower portion 118, the O-ring being retained by a lip 120. The lower portion 118 of the plunger 114 includes a bottom surface 122 through which air cannot penetrate, so that the upper port 90 is closed when the plunger lower portion 118 is received by the passageway 36 with the O-ring 116 in seating engagement with the upper valve conical seat 112. The plunger 114 is supported within the valve assembly 32 such that it may travel along the vertical axis 86 for opening or closing the upper port 90. In the preferred embodiment, the plunger 114 is supported for such vertical movement by means of a dowel pin 124 situated along the vertical axis 86 and attached by its upper end to a central boss 126 of a cap 128 included by the valve cover 44. The plunger 114 contains a central vertical bore 130 which slideably receives the pin 124, with a loose fit, permitting the plunger 114 to be guided along the vertical axis 86. The plunger 114 is free to travel downwardly by means of its own weight; the plunger 114 may be made of a metal such as stainless steel or brass, or it may be made of a plastic material which may be made heavier by inclusion of a weighted insert.

As best seen in FIG. 5a, the lower portion 118 of the plunger 114 has an exterior conical surface 132 extending upwardly and outwardly about the vertical axis 86, by an angle of inclination $\beta$, and the inner circumference of the O-ring 116 is in contact with the plunger conical surface 132. The interior conical passageway surface 112 extends upwardly and outwardly about the vertical axis 86, by an angle of inclination $\gamma$ which is equal to or greater than the angle of inclination $\beta$ of the plunger conical surface 132. When the plunger 114 is permitted to be gravitationally lowered into the passageway 36, an annular space is created between the two conical surfaces 112, 132 in which is disposed the O-ring 116, the outer circumference of the O-ring 116 being in contact with the passageway conical surface 112 to close (but not necessarily seal) the upper port 90. If the plunger 114 is of sufficient weight to cause further gravitational lowering of the plunger 114, the decrease of the annular space in the vicinity of the O-ring 116 as the plunger 114 descends causes the O-ring 116 to roll about itself upon the plunger conical surface 132 and the passageway conical surface 112, while being slightly squeezed, as shown in FIG. 2. When the plunger 114 is further coerced downwardly—such as will occur by the vacuum within the tank 10 produced by the head or column of water in the tank 10 above the pool when the motor is shut off or not operating—the further decrease of the annular space in the vicinity of the O-ring 116 as the plunger 114 descends causes the O-ring 116 to further roll about itself upon the plunger conical surface 132 and the passageway conical surface 112, while being squeezed. Such rolling and squeezing may continue until the downward movement of the plunger 114 stops upon contact of the lip 120 with a stop 134 in the passageway 36, as shown in FIG. 5b. The height of the plunger conical surface 132 is sufficient to assure that the O-ring 116 will not roll off the conical surface 132 (i.e., onto the cylindrical surface 135 of the plunger 114) when the plunger 114 ceases its downward movement upon contact with the stop 134. The result is a tight seal between the plunger 114 and the passageway surface 112 for maintaining the upper port 90 closed.

The nominal diameters of the plunger lower portion 118 and the valve seat 112, the angles $\beta$ and $\gamma$, and the characteristics of the O-ring 116 are selected such that the downward movement of the plunger 114 causes the O-ring 116 to rotate less than one-half turn, and preferably approximately three-eighths of a turn. In one example, the nominal diameter of the plunger conical surface 132 is 0.57 inch, the nominal diameter of the passageway conical surface 112 is 0.68 inch, $\beta$ is 2°, $\gamma$ is 4°, and the O-ring 116 is a Parker No. 2-015. In a variation of the preceding example where $\beta$ is equal to $\gamma$, the angles $\beta$ and $\gamma$ may be 3°.

In the improved valve assembly 32 (FIG. 2) according to the present invention, a tang 136 projects downwardly from the bottom surface 122 of the plunger 114, extending along the central vertical axis 86. The tang 136 is sufficiently long such that when the bottom end 137 of the tang 136 rests on top of the ball 100 when the ball is in its uppermost position (i.e., when the lower valve 106 is in its closed condition), the plunger 114 is vertically positioned such that the plunger O-ring 116 does not contact the passageway conical surface 112 (i.e., the upper valve 110 is in its open condition), as shown in FIG. 7.

Operation of the valve assembly 32, as well as other structural features thereof, will be described by reference to FIGS. 2, 6, 7, 8 and 9. FIG. 2 shows the condition of the valve assembly 32 before an initial filling of the water tank 10 with water. The pump is not operating during this time, and the pressure of the air within the tank 10 is substantially the same as the pressure of the ambient air outside the tank 10. Under such "normal" conditions, the lower valve 106 is open, the buoyant ball 100 resting at the bottom of the support basket 70. Meanwhile, the upper valve 110 is closed, the plunger resting by its own weight with the O-ring 116 contacting the conical surfaces 112, 132, as shown more clearly in FIG. 5a, or more likely with the O-ring 116 slightly rolled as indicated in FIG. 2.

When the pump 26 (FIG. 1) is turned on, the water entering the tank 10 must fill the tank 10 for efficient filtration to occur. During the filling process, water displaces the air within the tank 10 and causes the air to flow upwardly through the basket slots 102 and the lower port 88 and to impinge upon the bottom surface 122 of the plunger 114 with sufficient pressure to lift the plunger 114, as shown in FIG. 6. The upward travel of the plunger 114 along the vertical axis 86 is limited by the O-ring 112 contacting an annular stop 138 extending from the cover 44. The air escapes from the tank 10, through the passageway 36 and the cover apertures 48. While air is flowing from the tank 10 in such manner, the upper valve 110 remains in its open condition.

When the filling of the tank has proceeded to the extent that water is entering the support basket 70 through the slots 102, continued filling causes the water to lift the buoyant ball 100 from the bottom of the basket 70 and, loosely guided by the guide surfaces 104, the ball 100 is forced into seating engagement with the lower valve seat 92 as the water pressure increases through operation of the pump (FIG. 7). It should be noted that the inside diameter of the basket 70 is sufficiently greater than the diameter of the ball 100 to permit the ball 100 to freely float upwardly without being unduly constrained by the guide surfaces 104.

Because of the rapidity with which the ball 100 may be forced against the lower valve seat 92, a small amount of water may spurt from the passageway 36 through the upper port 90. This water is caught by the catch basin 38 and then drained through the drain hole 40 and drain tube 42. In order to protect the operative valve portions of the upper valve member 114 from any deleterious effects from this spurt of water, which may contain some diatomaceous earth if a diatomaceous earth filter is being used, the annular stop 138 extending from the cover 44 is configured such that the stop 138, together with the plunger lip 120, houses the upper valve O-ring 116 when the plunger 114 is in its uppermost position (as shown in FIG. 6), isolating the plunger 114 (except for its bottom surface 122 and depending tang 136) from the valve body 34. The O-ring 116 forms a seal with the stop 138, precluding water from entering the cap 128 and reaching the operative valve portions of the valve member 114.

While the upper valve 110 remains open, the plunger 114 is retained in a vertical position above the passageway upper port 90 by virtue of the inserted pin 124 and the plunger's loose insertion within the circular opening of the annular stop 138. The stop 138 determines the maximum distance of the plunger's bottom surface 122 above the passageway upper port 90. Accordingly, while the upper valve 110 is open, the plunger's bottom surface 122 and the O-ring 116 are retained in the vicinity of the upper port 90 and the upper valve seat 112.

When the tank 10 is full of water while the pump is operating, the lower valve 106 is in a closed condition, as shown in FIG. 7. The force derived from the water pressure forces the ball 100 onto the lower valve seat 92. As determined by the magnitude of the force, the ball 100 may be stopped by the stop 108. Meanwhile, since the passageway lower port 88 has been closed to the flow of air or water from the tank 10, the upper valve plunger 114 falls by its own weight along the pin 124 until the bottom end 137 of the tang 136 contacts the top of the ball 100. Because of the force exerted on the ball 100 by the water pressure, the tang 134 does not dislodge the ball 100 from its seat 92 while the pump is operating but instead prevents the plunger 114 from descending to close the upper port 90.

Swimming pool filters ordinarily operate in accordance with a preselected cycle during each twenty-four hour period; for example, the filter pump may operate eight hours and be inoperative sixteen hours during each day. When the pump is turned off, the water pressure within the tank 10 returns to atmospheric and the ball 100 is no longer being forced against its valve seat 92. The plunger tang 136, being in contact with the top of the ball, applies the weight of the plunger 114 as a downward force for coercing the ball 100 away from its seat 92. Since the filter tank 10 is located above the level of the swimming pool, the tendency for water to drain from the tank 10 into the pool (e.g. through the lower pipe 18, FIG. 1) will create a vacuum in the upper portion of the tank 10, causing the plunger 114 to be coerced downwardly until its bottom lip 120 contacts the stop 134, sealing the upper port 90 as previously described with respect to FIG. 5b. Since air cannot enter the tank 10, the water within the tank will not drain into the swimming pool and the tank 10 will remain filled with water. This condition is shown in FIG. 5b and in FIG. 11 insofar as relevant here, it being understood that the variations between the embodiment shown in FIG. 11 and the embodiment shown in FIG. 2 are not pertinent to the present discussion.

The provision of the tang 136 depending from the plunger 114 prevents the upper valve 110 and the lower valve 106 from being in their closed conditions at the same time. In the absence of the tang 136 (or other device for preventing both valves 106, 110 from being simultaneously in their closed conditions), a small negative pressure can exist in the portion of the passageway 36 between the plunger bottom surface 122 and the ball 100 when both valve members 100, 114 are seated, such as when the tank 10 is full of water under pressure. The small negative pressure may be caused by such factors as, for example, temperature changes or vibration in the system, and its effect could be to retain the ball 100 against its seat 92, or to "hang up," when the pump is turned off. This condition is avoided by the provision of the tang 136 which assures that the lower valve 106 opens when the pump's operation ceases while the tank 10 is full of water, and assures that the upper valve 110 after opening remains open when the lower valve 106 closes (and remains closed) in response to the tank's being full of water while the pump is operating.

When the pump is restarted, the pressure within the tank 10 forces the plunger 114 upwards to open the upper valve 110. As the plunger 114 is lifted, the plunger O-ring 116 unwinds and is retained by the plunger lower lip 120. The pressurized water forces the buoyant ball 100 against its seat 92 to close the lower valve 106, and the ball's contacting the bottom of the tang 136 prevents the plunger 114 from being lowered against its seat 112, maintaining open the upper valve 110 while the lower valve 106 remains in its closed condition in response to the pressurized water within the tank 10.

In practice, on initial pump start-up a small amount of air is generally trapped in the tank 10 because of the rapidity with which the ball 100 may be forced against the valve seat 92. In addition, air remaining in the filter elements will be released with time into the upper portion of the tank 10, as will air released from solution in the water itself. With each successive pump turn-on cycle, however, more of the air is evacuated, although with each pump turn-off cycle the small amount of air which was present between the two closed valve members 100, 114 will be introduced into the tank 10.

When it is desired to drain the water from the tank 10 (for example, so that the filter elements may be removed for cleaning), air must be admitted into the tank for displacing the water being drained. Turning to FIGS. 6 and 7, which are respectively side and front elevation cross-sectional views of the valve assembly 32, a pair of L-shaped bars 140 are horizontally positioned within the cap 128 and attached at their ends to a pair of shields 142 such that the shield/bar combination 142, 140 is movable along the vertical axis 86. The bars 140 are positioned such that their inwardly oriented horizontal legs 144 are below an annular lip 146 horizontally extending about the top of the plunger 114, and interfere with the lip 146 for moving the plunger 114 upwards when an external force is applied to the shields 142 to move the shields 142 upwardly a distance limited by the bars' 140 contacting the cap 124, as shown in FIGS. 8 and 9.

To permit draining of the tank 10 when the pump is not operating, an operator places opposing fingers within the depressions 148 provided by the contoured shields 142, and pulls the pair of shields 142 upwardly. Such upward movement causes the bars 140 to engage the plunger upper lip 146 and to pull the plunger 114 upwardly from its position shown in FIG. 11, until the bars 140 make contact with the cap 124 for stopping upward movement.

An alternative configuration for applying the external force for lifting the plunger 114, is shown in FIG. 10. In this alternative configuration, the shield/bar structure 142, 140 is not utilized and instead openings 150 are provide in the cap 124. To permit draining of the tank, an operator presses opposing fingers against the upper cylindrical surface of the plunger 114, through the openings 150, and pulls the plunger 114 upwardly until it makes contact with the stop 138.

In either configuration, as the plunger is pulled upwardly from its lowermost position shown in FIG. 11, the plunger O-ring 116 unwinds and is retained by the plunger lower lip 120. While the plunger is held in its upward position by the operator applied force, the upper valve 110 is maintained in its open condition and ambient air will enter the tank 10 through the apertures 48, the passageway 36 and the basket slots 102. When the operator causes the plunger 114 to be released (either by releasing the shields 142 in the preferred configuration shown in FIG. 8, or by releasing the plunger 114 in the alternative configuration shown in FIG. 10) after the tank 10 has been drained to the extent desired, the plunger 114 falls to resume the normally closed condition of the upper valve 110.

The provision of the shields 142 of the preferred configuration discourages extraneous foreign matter such as leaves to enter the valve assembly 32, as may occur under certain conditions with the alternative configuration of FIG. 10.

FIG. 11 shows a variation of the preferred embodiment of the present invention in which the lower valve 106 is removed from the inside of the tank 10 while communicating with the inside of the tank 10. This variation is particularly useful as a replacement for a manual air relief valve on an older filter tank 10' and may utilize an aperture 152 and nipple 154 existing in the filter tank 10'.

This valve assembly embodiment 32' includes a vessel 156 for containing the lower portion of the lower valve 106, and the vessel 156 is attached to the valve body 34 by means of a threaded central aperture 158 of an adapter 160 engaging the circumferential threads 68 of the valve body 34. The adapter 160 is secured to the upper portion of the vessel 156, and a support basket 168 is appended to the valve body 34 (in like manner as described with respect to FIG. 2) within the vessel 156.

The bottom of the vessel 156 includes a threaded aperture 162 in sealing engagement with the nipple 154. The vessel 156 may also include an internally threaded nipple 164 to which a pressure gage 166 may be connected.

The valve assembly 32' of FIG. 11 operates in substantially the same manner as the valve assembly 32 of FIG. 2, except as hereinafter discussed. The valve assembly 32' is situated above the tank 10', although in communication with the inside of the tank 10' at its top or upper portion, so that the tank 10' will be full of water when the water enters the vessel 156 to cause the lower valve 106' to close. The water entering the vessel 156 is turbulent, and the ball 100' is required to be more constrained during its upward travel than in the embodiment shown in FIG. 2. Accordingly, the basket 168 of the embodiment of FIG. 11 includes guide rails 170, for guiding the ball 100' upwardly in a relatively constrained manner when water enters the vessel 156 and forces the ball 100' from the bottom of the basket 168. There is also an optimum size relationship between the maximum diameter of the ball 100' and the inside diameter of the vessel 156. One example of suitable dimensions is provided by a valve assembly 32' having a vessel 156 of approximately 2.16 inches inside diameter and a 0.625 inch diameter lower valve ball 100'.

The basket 168 is shorter than the basket 70 of FIG. 2, and the length and location of the slots 172 of the basket 70 are of importance. In the example given above, a suitable basket 168 includes slots beginning at the mid-height of the ball 100', when the ball 100' is resting on the bottom of the basket 168, and ending slightly below the inclined lower surface 174 of the adapter 160. The basket interior wall portion 176 between the top of the slots 172 and the inclined surface 174 acts like a baffle. The water entering the vessel 156 from the tank 10' is thereby diverted under the ball 100', forcing the ball 100' upwardly and, guided by the guide rails 170, into seating engagement with the lower valve seat 92 for closing the lower valve 106'.

Figure 12:
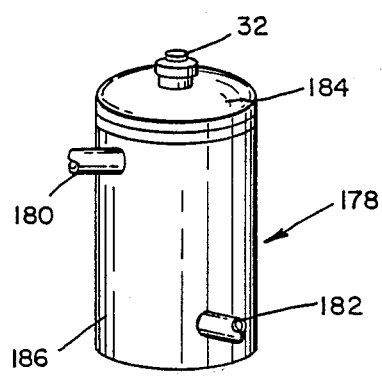
FIG. 12 is a perspective elevation view of a separation tank for use with a diatomaceous earth filter, shown with the valve assembly of the present invention in place.

Turning finally to FIG. 12, there is shown a separation tank 178 of a type which is often used with a diatomaceous earth filter tank. The separation tank 178 normally does not communicate with the filter tank 10; however, when the filter tank 10 is backwashed to remove dirty diatomaceous earth therefrom, the backwashed water from the filter tank 10 is pumped through a separation tank inlet 180 and directed through a separation bag (not shown) within the separation tank 178 to remove the diatomaceous earth from the water. The clean water thereupon leaves the separation tank 178 through a water outlet 182 and is returned to the pool. During this procedure, air must be evacuated from the separation tank 178 as it fills with water, and the separation tank 178 must then be sealed to permit proper water circulation with the pool. When separation is completed and the pump is turned off, air must be introduced into the separation tank 178 to permit water to drain therefrom, so that the cover 184 may be removed from the body 186 of the separation tank 176 for permitting removal of the filled separation tank bag. These valve functions, which are conventionally carried out by manipulation of a manual air relief valve, may be advantageously carried out by means of the dual valve assembly 32 of the present invention. Accordingly, the valve assembly 32 of the present invention is shown in FIG. 12, in combination with the separation tank 178 attached and functioning in similar manner as has been previously described with respect to the filter tank 10 of FIG. 1.

The various components of the valve assembly of the present invention may be of metal or plastic materials, and may be machined by conventional methods. It would appear advantageous, from considerations of economy as well as corrosion resistance, however, to manufacture the various components from a plastic material such as polypropylene or ABS, by such techniques as injection molding; subject to certain exceptions, such as the dowel pin 124 and the plunger 114 which may be machined of a noncorrosive metal such as stainless steel or brass. The O-rings may be of conventional type, e.g. of rubber or synthetic rubber.

Other embodiments of the present invention, and other modifications and variations of the embodiments and variations presented, may be developed without departing from the essential characteristics thereof. Although the preferred embodiment has been described in a swimming pool environment, the present invention may find applicability in other environments and in combination with tanks for holding liquids other than water and in atmospheres of gases other than air. Accordingly, the invention should be limited only by the scope of the claims listed below.

We claim:

1. A valve assembly connected to the upper portion of a tank for being filled with and drained of liquid, the valve assembly comprising:
   first valve means communicating with the inside of the tank, said first valve means responsive for being closed by the tank's being full of pressurized liquid;
   second valve means communicating with said first valve means and the outside of the tank, said second valve means responsive for being opened by gas being expelled from the tank through said first valve means when liquid is filling the tank for permitting the gas being expelled to exit through said second valve means;
   means cooperating with said first valve means and said second valve means for preventing both of said first and second valve means from being simultaneously maintained in their closed conditions; and
   selectively actuable means associated with said second valve means for permitting an external force to be applied to said second valve means, for opening and maintaining open said second valve means while said force is applied during selected times when liquid in the tank is not pressurized for permitting gas outside the tank to enter the tank and liquid to drain from the tank.

2. A valve assembly connected to the upper portion of a water tank having water inlet means and water outlet means, the valve assembly comprising:
   normally open first valve means communicating with the inside of the tank, said first valve means responsive for being closed by the tank's being full of pressurized water;
   normally closed second valve means communicating with said first valve means and the outside of the tank, said second valve means responsive for being opened by air being expelled from the tank through said first valve means when water is filling the tank through said water inlet means for permitting the air being expelled to exit through said second valve means;
   means cooperating with said first valve means and said second valve means for preventing said second valve means from being in its closed condition when said first valve means is in its closed condition and the tank is full of pressurized water; and selectively actuable means associated with said second valve means and responsive to an externally applied force for opening and maintaining open said second valve means while said force is applied during selected times when said valve assembly is connected to the tank and water is not entering the tank for permitting air to enter the tank and water to drain from the tank.

3. A valve assembly connected to the upper portion of a water tank having water inlet means and water outlet means, the valve assembly comprising:

first valve means communicating with the inside of the tank, said first valve means responsive for being closed by the tank's being full of pressurized water;

second valve means communicating with said first valve means and the outside of the tank, said second valve means responsive for being opened by air being expelled from the tank through said first valve means when water is filling the tank through said water inlet means for permitting the air being expelled to exit through said second valve means, said second valve means being further responsive to an externally applied force for opening and maintaining open said second valve means while said force is applied during selected times when water is not entering the tank for permitting water to be drained from the tank; and means cooperating with said first valve means and said second valve means for preventing both of said first and second valve means from being simultaneously maintained in their closed conditions.

4. The apparatus according to claim 3, above, said valve assembly further including vessel means enclosing said first valve means, said vessel means attached to the outside of the tank and communicating with the inside of the tank such that water enters said vessel means after said tank becomes full of water.

5. The apparatus according to claims 3 or 4, above, wherein said means cooperating includes means coupled to said second valve means for precluding said second valve means from closing when said first valve means is in a closed condition in response to the tank's being full of pressurized water.

6. The apparatus according to claims 3 or 4, above, wherein said means cooperating includes means coupled to said second valve means for precluding said first valve means from remaining in a closed condition when the water in the tank is not pressurized.

7. The apparatus according to claims 3 or 4, above, wherein said means cooperating includes means coupled to said second valve means for precluding said second valve means from closing when said first valve means is in a closed condition in response to the tank's being full of pressurized water and for precluding said first valve means from remaining closed when the water in the tank is not pressurized.

8. The apparatus according to claims 3 or 4, above, wherein said means cooperating includes means coupled to said second valve means for assuring that said first valve means opens when the tank is full of unpressurized water.

9. The apparatus according to claims 3 or 4, above, wherein said means cooperating includes means coupled to said second valve means for precluding said second valve means from closing while said first valve means is in a closed condition in response to the tank's being full of pressurized water and for assuring that said first valve means opens when the pressurized water in the tank becomes unpressurized.

10. Swimming pool apparatus, comprising the combination of:

a water tank having a water inlet and a water outlet for communicating with a swimming pool having coupled thereto a pump for circulating water from the pool through said water inlet into said tank and from said tank through said water outlet into the pool; and a valve assembly connected to the upper portion of said tank and including normally open lower valve means communicating with the inside of said tank and responsive for being closed by said tank's being full of water while the pump is operating, normally closed upper valve means communicating between said lower valve means and the outside of said tank, said upper valve means responsive for being opened by air being expelled from said tank through said lower valve when water is filling said tank while the pump is operating for permitting the air being expelled to exit through said upper valve means, means cooperating with said lower valve means and said upper valve means for preventing both of said upper and lower valve means from being simultaneously maintained in their closed conditions, and means associated with said upper valve means for permitting an external force to be applied to said upper valve means for opening and maintaining open said upper valve means while said force is applied during selected times while the pump is not operating for permitting air to enter said tank and water to drain from said tank.

11. The apparatus according to claim 10, above, said valve assembly further including vessel means enclosing said lower valve means, said vessel means attached to the outside of the tank and communicating with the inside of said tank such that water enters said vessel means after said tank becomes full of water.

12. The apparatus according to claim 10, above, wherein said means cooperating includes means coupled to said upper valve means for precluding said upper valve means from closing when said lower valve means is in a closed condition in response to said tank's being full of water while the pump is operating.

13. The apparatus according to claim 10, above, wherein said means cooperating includes means coupled to said upper valve means for precluding said lower valve means from remaining in a closed condition when the pump is not operating.

14. The apparatus according to claim 10, above, wherein said means cooperating includes means coupled to said upper valve means for precluding said upper valve means from closing when said lower valve means is in a closed condition in response said tank's being full of water while the pump is operating, and for precluding said lower valve means from remaining closed when the pump is not operating.

15. The apparatus according to claim 10, above, wherein said means cooperating includes means coupled to said upper valve means for assuring that said lower valve means opens when the pump's operation ceases while said tank is full of water.

16. The apparatus according to claim 10, above, wherein said means cooperating includes means coupled to said upper valve means for precluding said upper valve means from closing while said lower valve is in a closed condition in response to said tank's being full of water while the pump is operating, and for assuring that said lower valve means opens when the pump's operation ceases while said tank is full of water.

17. The apparatus according to claim 10, above, wherein said valve assembly includes a body having a passageway communicating with the inside of said tank through a lower port and communicating with the outside of said tank through an upper port, and wherein:
said lower valve means includes
a buoyant lower valve member,
a lower valve seat in said body about said lower port and adapted for seating engagement with said lower valve member for closing said lower port, and
means situated under said lower port for containing said lower valve member when unseated and for permitting said lower valve member to engage said lower valve seat when said tank becomes full of water;
said upper valve means includes
an upper valve seat in said body about said upper port,
an upper valve member adapted for seating engagement with said upper valve seat for closing said upper port, said valve member being normally in seating engagement with said upper valve seat and responsive to air being expelled from said tank through said passage for being unseated therefrom, and
retaining means for retaining said valve member in the vicinity of said upper valve seat when unseated; and
said means cooperating includes means coupled to said upper valve member for preventing both of said lower valve member and said upper valve member from being simultaneously engaged with their respective seats.

18. The apparatus according to claim 17, above, wherein said buoyant lower valve member has a spherical surface and wherein said lower valve seat comprises:
an annular channel about said lower port and including a wall describing a conical surface having a diameter decreasing toward said passageway, and
an O-ring having an inside diameter smaller than the diameter of said spherical surface of said lower valve member, said O-ring being situated in said channel and in contact with said wall for sealing said lower port when said spherical surface of said buoyant lower valve member is forced against said O-ring toward said passageway.

19. The apparatus according to claim 17, above, wherein said upper valve member is selectively actuable upon application of said external force for being unseated from said upper valve seat for permitting air to enter said tank.

20. The apparatus according to claim 17, above, further including means for receiving water exiting from said upper port and for draining therefrom the water received.

21. The apparatus according to claim 17, above, further including means for precluding water exiting said upper port from contacting operative portions of said upper valve member when said upper valve member is retained by said retaining means.

22. The apparatus according to claim 10, above, wherein said valve assembly includes a body having a passageway about a vertical axis and communicating with the inside of said tank through a lower port about said axis and communicating with the outside of said tank through an upper port about said axis, and wherein:
said lower valve means includes
a buoyant valve member,
a valve seat in said body about said lower port and adapted for seating engagement with said valve member for closing said lower port, and
means situated under said lower port for containing said valve member when unseated and for permitting said valve member to move upwardly along said axis to engage said valve seat when said tank becomes full of water;
said upper valve means includes
a conical surface of said body passageway about said upper port, said surface being upwardly and outwardly inclined about said axis,
a plunger adapted for vertical movement along said axis for being received by said passageway, said plunger having an upwardly and outwardly inclined conical surface about said axis, and
an O-ring carried by said plunger and with its inner circumference in contact with said plunger conical surface, the outer circumference of said O-ring being in contact with said passageway conical surface when said plunger is received by said passageway such that said O-ring is disposed within an annular space between said conical surfaces for closing said upper port; and
said means cooperating includes a tang affixed to and projecting downwardly from said plunger along said axis and having a bottom end, the axial length of said tang being sufficiently great so as to prevent said plunger from closing said upper port when said bottom end contacts said buoyant valve member closing said lower port in response to said tank's being full of water while the pump is operating.

23. The apparatus according to claim 22, above, wherein the inclination of said passageway conical surface from said axis is equal to or greater than the inclination of said plunger conical surface from said axis.

24. The apparatus according to claim 22, above, wherein said O-ring rolls upon said plunger conical surface and wedges between said conical surfaces and within said annular space as said plunger is coerced downwardly along said axis after said O-ring contacts said passageway conical surface.

25. The apparatus according to claim 24, above, further including stop means associated with said passageway for stopping downward movement of said plunger after said O-ring is wedged between said conical surfaces.

26. The apparatus according to claim 22, above, further including means for retaining said plunger along said axis and in the vicinity of said upper port when said plunger is not received by said passageway.

27. The apparatus according to claim 26, above, further including means for precluding water exiting said upper port from contacting operative portions of said plunger when said plunger is retained by said retaining means.

28. The apparatus according to claim 22, above, further including means for receiving water exiting said upper port and for draining therefrom the water received.

29. The apparatus according to claim 22, above, wherein said plunger is accessible for being manually coerced upwardly at selected times for opening said upper port.

30. The apparatus according to claim 22, above, further including means coupled to said plunger and for being manually coerced upwardly at selected times, said means urging said plunger upwardly for opening and maintaining open said upper port while said means is coerced upwardly.

31. The apparatus according to claims 10, 11, 12, 13, 14, 15, 16, 17, 18, 19, 20, 21, 22, 23, 24, 25, 26, 27, 28, 29 or 30, above, wherein said water tank comprises a swimming pool filter tank.

32. The apparatus according to claims 10, 11, 12, 13, 14, 15, 16, 17, 18, 19, 20, 21, 22, 23, 24, 25, 26, 27, 28, 29 or 30 above, wherein said water tank comprises a separation tank for being coupled to a swimming pool filter tank, said water inlet adapted for supplying pool water to said separation tank from the filter tank when said separation tank is coupled to the filter tank.

* * * * *